US012763621B2

(12) United States Patent
Ho

(10) Patent No.: US 12,763,621 B2
(45) Date of Patent: Oct. 13, 2026

(54) ROTOR MAGNETS FIXING STRUCTURE

(71) Applicant: ASIA VITAL COMPONENTS CO., LTD., New Taipei City (TW)

(72) Inventor: Chun Liang Ho, New Taipei City (TW)

(73) Assignee: ASIA VITAL COMPONENTS CO., LTD., New Taipei City (TW)

( * ) Notice: Subject to any disclaimer, the term of this patent is extended or adjusted under 35 U.S.C. 154(b) by 166 days.

(21) Appl. No.: 18/986,935

(22) Filed: Dec. 19, 2024

(65) Prior Publication Data

US 2026/0163427 A1 Jun. 11, 2026

(30) Foreign Application Priority Data

Dec. 5, 2024 (TW) ................................ 113147277

(51) Int. Cl.
*H02K 1/28* (2006.01)
*H02K 1/278* (2022.01)

(52) U.S. Cl.
CPC ............... *H02K 1/28* (2013.01); *H02K 1/278* (2013.01)

(58) Field of Classification Search
CPC .......... H02K 1/278; H02K 1/28; H02K 1/274; H02K 1/2733; H02K 15/03
See application file for complete search history.

(56) References Cited

U.S. PATENT DOCUMENTS 5,345,669 A * 9/1994 Zigler ................. H01F 41/0253 310/156.28
6,084,330 A * 7/2000 Fisher .................... H02K 15/03 29/598
2008/0169719 A1 7/2008 Yu
2016/0359384 A1 12/2016 Okamoto et al.
2021/0344239 A1* 11/2021 Lee ........................ H02K 1/278
2023/0396106 A1* 12/2023 Dehn ..................... H02K 1/278

FOREIGN PATENT DOCUMENTS

| | | | |
|---|---|---|---|
| CN | 118413027 | A | 7/2024 |
| TW | M289928 | U | 4/2006 |
| TW | M643565 | U | 7/2023 |
| TW | M670869 | U | 6/2025 |

OTHER PUBLICATIONS

Search Report dated Aug. 6, 2025 issued by Taiwan Intellectual Property Office for counterpart application No. 113147277.

* cited by examiner

*Primary Examiner* — Christopher M Koehler
*Assistant Examiner* — Ahmed F Seck
(74) *Attorney, Agent, or Firm* — Demian K. Jackson; Jackson IPG PLLC

(57) ABSTRACT

A rotor magnets fixing structure includes a magnetizable main body consisting of laminated silicon steel sheets; multiple magnets fitly contacting with a circumferential surface of the magnetizable main body; and two end surface silicon steel sheets disposed on upper and lower ends of the magnetizable main body. The magnets are provided on respect upper and lower ends with a recess, and the end surface silicon steel sheets are provided on respective outer periphery with fixing lugs for covering the upper and lower ends of the magnets. The fixing lugs are formed with a retaining hook to interfere and engage with the recesses on the magnets. Therefore, the rotor can be manufactured with less cost and precision, while a frictional force between the retaining hooks and the recesses is increased to ensure stable magnet fixation and avoid damage and malfunction of the rotor and parts thereof.

5 Claims, 8 Drawing Sheets

ROTOR MAGNETS FIXING STRUCTURE

This application claims the priority benefit of Taiwan patent application number 113147277 filed on Nov. 5, 2024, the disclosure of which is hereby incorporated by reference in its entirety.

FIELD OF THE INVENTION

The present invention relates to a rotor structure, and more particularly, to a rotor magnets fixing structure.

BACKGROUND OF THE INVENTION

The currently commonly seen motor rotor structure, as shown in FIG. 1, includes a plurality of magnets 92 arranged around an outer circumferential side of a plurality of axially laminated silicon steel sheets 91 to provide an effect of magnetism and reduce core loss.

For the magnets 92 and the silicon steel sheets 91 to be fixed in position relative to one another, at least one fixing element 93, such as a pin, is used to extend into at least one through hole 910 formed between the magnets 92 and the silicon steel sheets 91, so as to limit the magnets 92 from moving relative to the silicon steel sheets 91. In some variants (not shown), the fixing elements 93 may be otherwise directly formed on the magnets 92 or the silicon steel sheets 91 to engage with the through hole 910 formed on the other one of the magnets 92 and the silicon steel sheets 91. In the case the fixing elements 93 are provided on around an outer circumferential surface of the silicon steel sheets 91 for fixing the magnets 92 to the silicon steel sheets 91, the through holes 910 must also be formed on the silicone steel sheets 91. This would limit the design flexibility in the arrangement of the magnets 92 on around the outer circumferential surface of the silicon steel sheets 91.

In addition, the silicon steel sheets 91 are in fact a plurality of discs, which are axially laminated to form a cylinder, and the magnets 92 are to be fixed to an outer periphery of the cylinder of the laminated silicon steel sheets 91. Under this condition, only when the fixing elements 93 are able to limit every silicon steel sheet 91 relative to the magnets 92, can each and all layers of the silicon steel sheets 91 be fixed in place. However, since the silicon steel sheets 91 are axially laminated, there is tolerance between the sizes of any two layers of the laminated silicon steel sheets 91. Therefore, the silicon steel sheets 91, the magnets 92, the through holes 910, and the fixing elements 93 all require high manufacturing precision for the fixing elements 93 to smoothly extend into the through holes 910 and avoid any hinderance for extending into the through holes 910 or insufficient close fitting of the magnets 92 to the silicon steel sheets 91. Further, since the silicon steel sheets 91 and the magnets 92 are made of relatively hard materials, a frictional force that can be withstood at the interfaces between the silicon steel sheets 91 and the magnets 92 is limited even if the fixing elements 93 are made of a tough material. This condition no doubt has a reverse influence on the secured fixation of the magnets 92 to the laminated silicon steel sheets 91.

On the other hand, even if the fixing elements 93 can be smoothly extended into the through holes 910 to limit all the layers of silicon steel sheets 91 in place relative to the magnets 92, the silicon steel sheets 91 located closest to the upper and the lower end surface of the cylinder of the laminated silicon steel sheets 91 are still subjected to easy separation from two ends of the fixing elements 93. Therefore, in some cases, upper and lower covers (not shown) are additionally provided to fix the silicon steel sheets 91 in place. However, the covers will increase an overall volume of the rotor and are also possibly separable from the laminated silicon steel sheets 91 and the magnets 92 and accordingly, can provide only very limited fixation effect.

In conclusion, insufficient tightness of fixation or possible separation of some silicon steel sheets 91 (or even the upper and lower covers) from other silicon steel sheets 91 would have an adverse influence on the stable operation of the rotor and tends to cause collision of the rotor with other parts to result in broken magnets 92 or even malfunction or failure of the rotor. With the conventional way of fixing rotor magnets, the flexibility in designing rotor structure is largely limited, high precision in manufacturing all related rotor parts is required, and the silicon steel sheets 91 and the magnets 92 are sensitive to manufacturing tolerance. Therefore, it is uneasy to effectively provide stable fixation of the axially laminated silicon steel sheets 91 relative to the magnets 92.

It is therefore tried by the inventor to develop an improved rotor magnets fixing structure to overcome the problems and drawbacks in the conventional rotor magnets fixation.

SUMMARY OF THE INVENTION

A primary object of the present invention is to provide an improved rotor magnets fixing structure, so as to effectively overcome the problems in the conventional way of fixing magnets to a plurality of silicon steel sheets.

To achieve the above and other objects, the rotor magnets fixing structure according to the present invention includes a magnetizable main body, a plurality of magnets, and two end surface silicon steel sheets.

The magnetizable main body consists of a plurality of silicon steel sheets that are axially laminated to one another. The magnetizable main body is formed on around an outer circumferential surface with at least one connecting area.

The magnets have an overall height corresponding to that of the magnetizable main body and respectively include a radially outer curved side and an opposite inner curved side. The inner curved sides of the magnets are in fit contact with the at least one connecting area on the outer circumferential surface of the magnetizable main body. At least a part of the magnets are provided on their respect upper end surface and lower end surface with a recess.

The end surface silicon steel sheets are disposed on an upper end surface and a lower end surface of the magnetizable main body, respectively. The end surface silicon steel sheets are correspondingly provided on along their respective outer periphery at positions corresponding to the magnets with at least one radially outward protruded fixing lug. The fixing lugs cover the upper end surfaces and the lower end surfaces of the magnets. At least a part of the fixing lugs are formed with an axially extended retaining hook. The retaining hooks correspondingly interfere with and hook to the recesses formed on the upper end surfaces and the lower end surfaces of the magnets.

In brief, according to the rotor magnets fixing structure of the present invention, the magnets can be stably fixed to the magnetizable main body through engagement of the retaining hooks of the fixing lugs on the end surface silicon steel sheets with the recesses formed on the magnets without the need of other additional fixing elements. With these arrangements, the rotor can be manufactured with less number of parts and without high requirement for machining precision, and the rotor can be finished with less material and have smaller overall volume. With the rotor magnets fixing structure of the present invention, the silicon steel sheets would not separate from the upper and lower ends of the magnetizable main body, and any external force unevenly applied to local areas of the magnetizable main body can be evenly spread to the magnets for the same to strain individually. Further, it is no longer necessary to form any through hole on the outer circumferential surface of the magnetizable main body to receive any fixing element. Therefore, the arrangement of the magnets on around the outer circumferential surface can be designed with more flexibility. In conclusion, the rotor magnets fixing structure of the present invention can largely reduce the number of fixing elements, the manufacturing cost, and the requirement for machining precision, while the frictional force that can be withstood at the interfaces between the magnets and the end surface silicon steel sheets as well as the magnet fixing stability are increased to thereby largely reduce the risk of damaging any element in the rotor and avoid malfunction or failure of the rotor.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
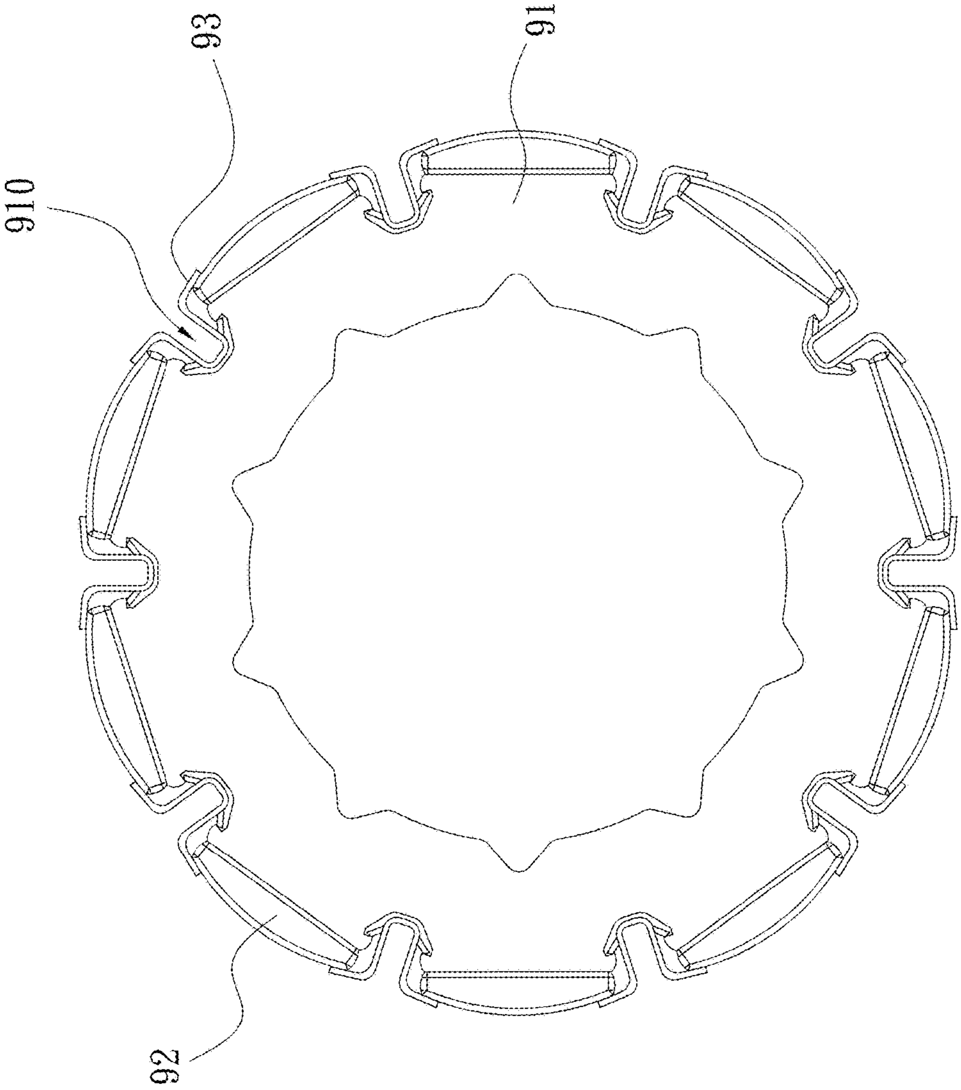
FIG. 1 (PRIOR ART)
FIG. 1 is a top view of a prior art rotor structure.

The present invention will now be described with some preferred embodiments thereof. For the purpose of easy to understand, elements that are the same in the preferred embodiments are denoted by the same reference numerals.

Figure 2:
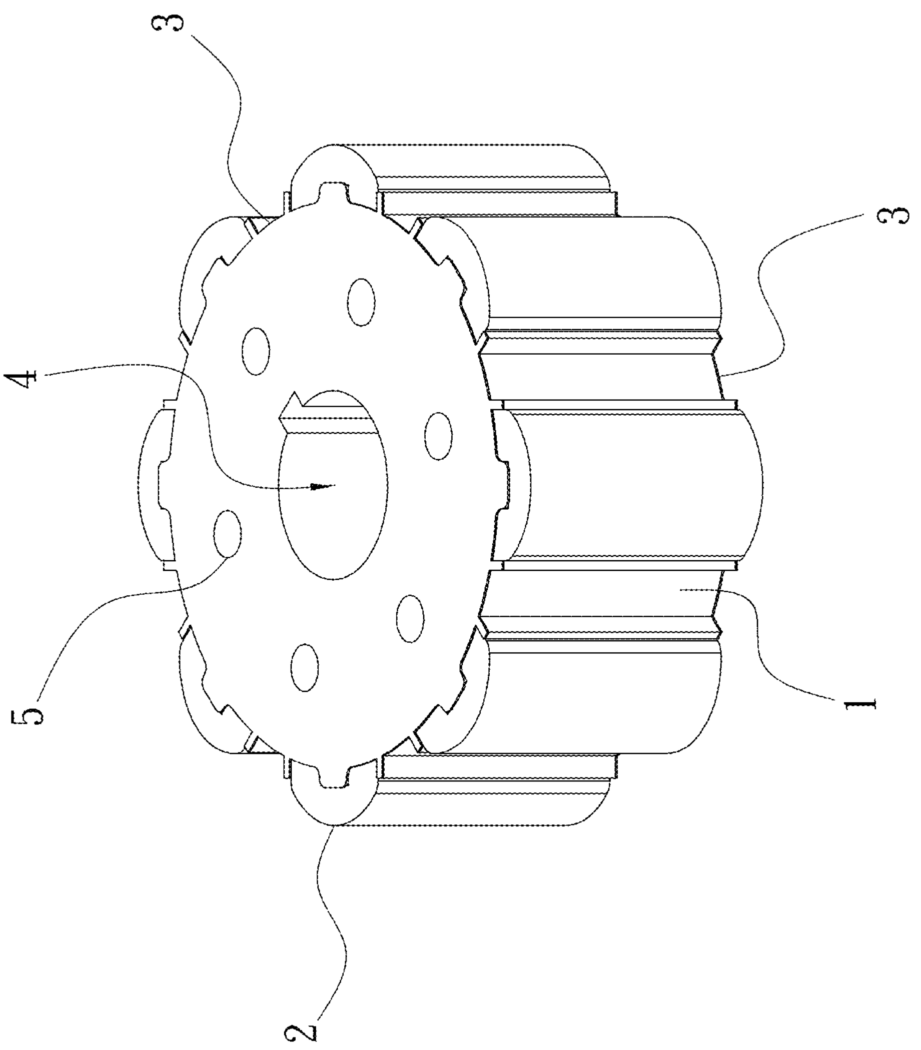
FIG. 2 is an assembled perspective view of a rotor magnets fixing structure according to a preferred embodiment of the present invention.
Figure 3:
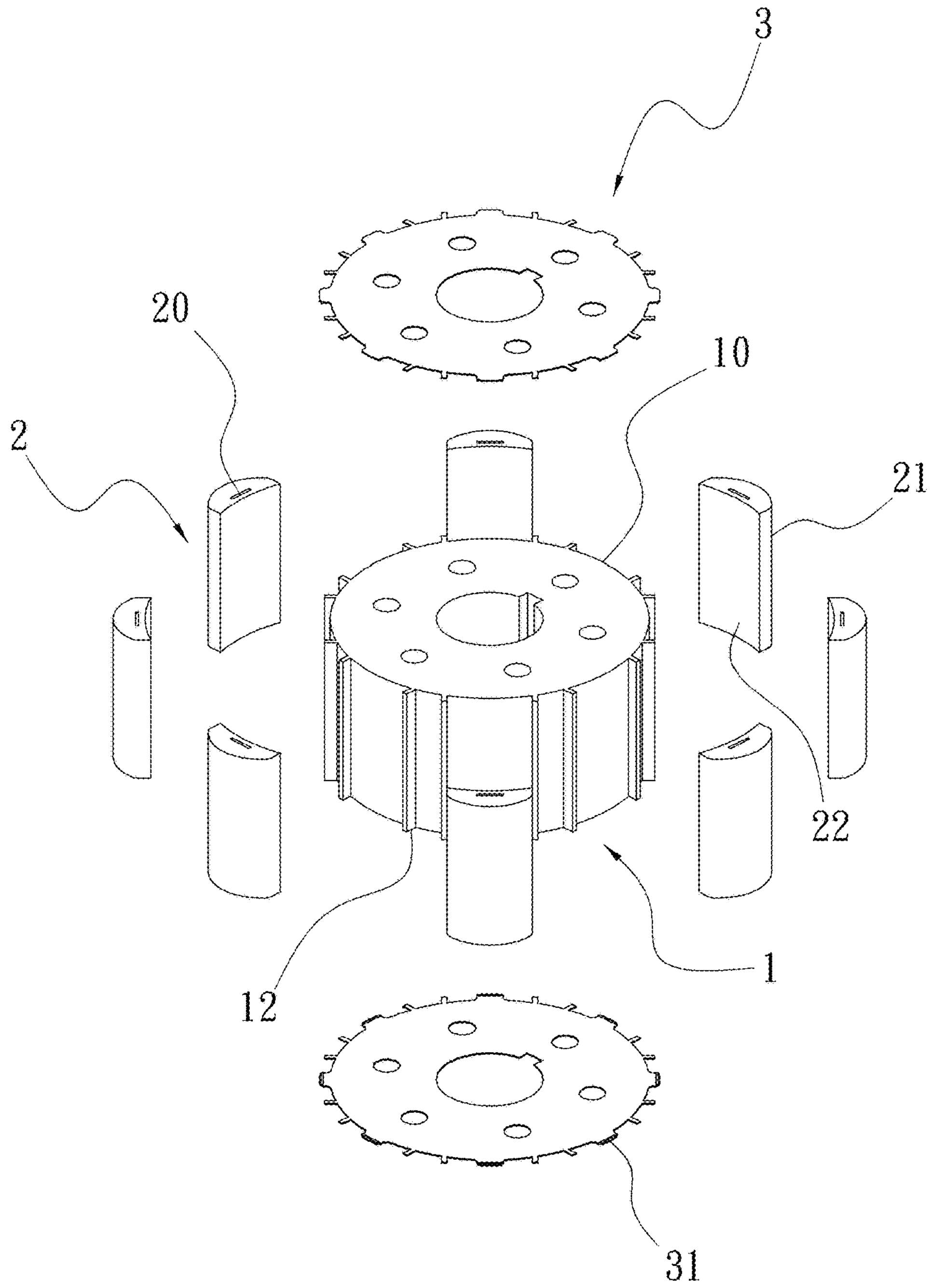
FIG. 3 is an exploded top view of the rotor magnets fixing structure of FIG. 2.
Figure 4:
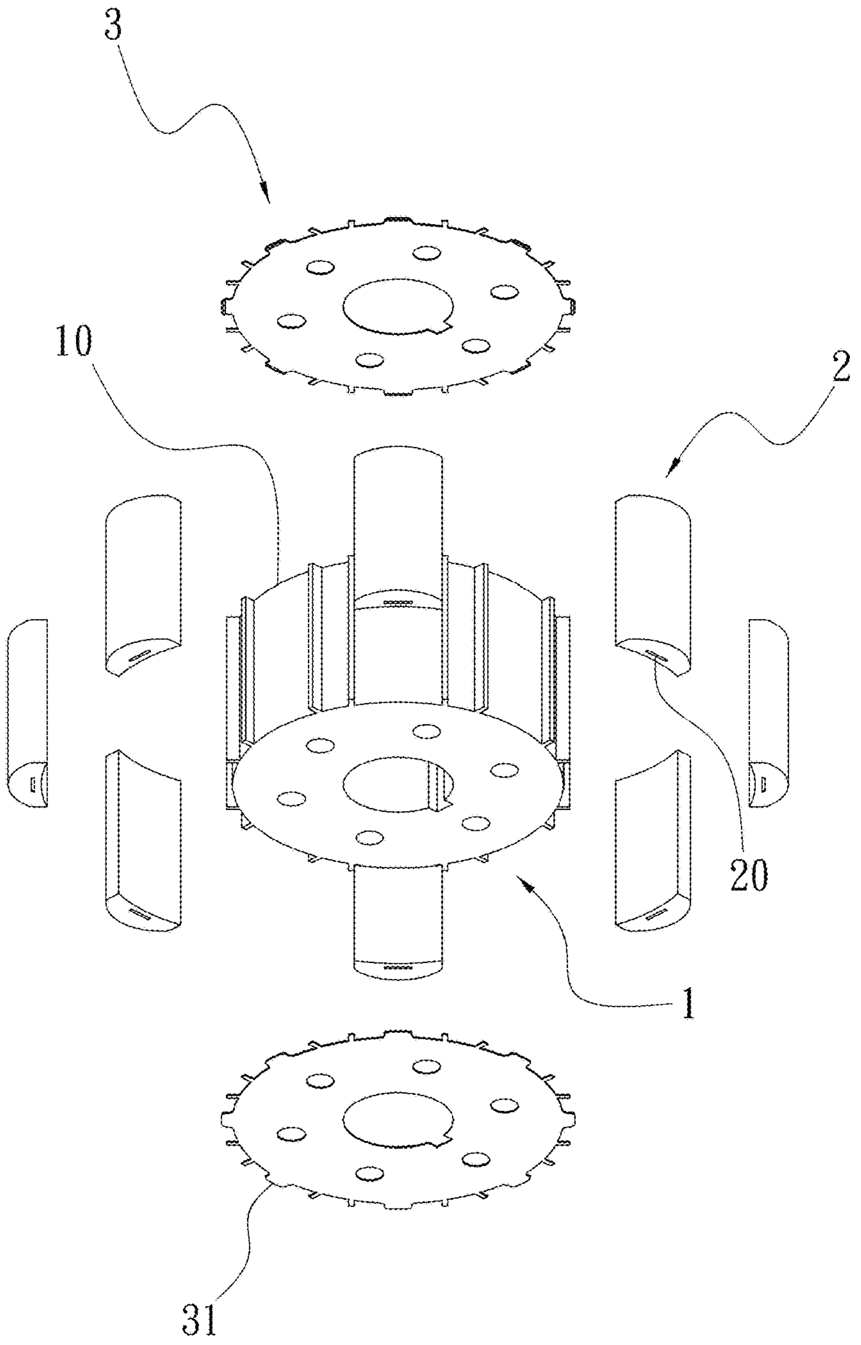
FIG. 4 is an exploded bottom view of the rotor magnets fixing structure of FIG. 2.
Figure 6:
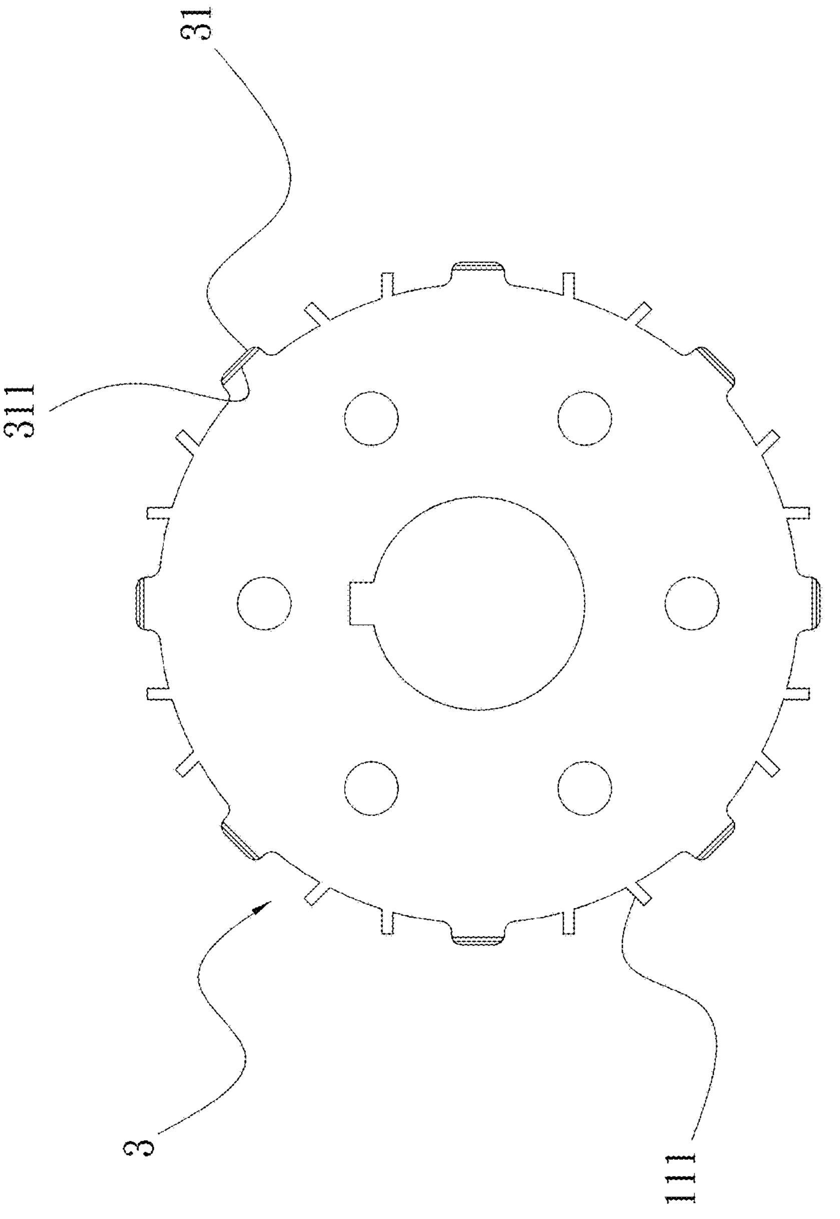
FIG. 6 is a front view of an end surface silicon steel sheet of the rotor magnets fixing structure according to the first embodiment of the present invention.
Figure 7:
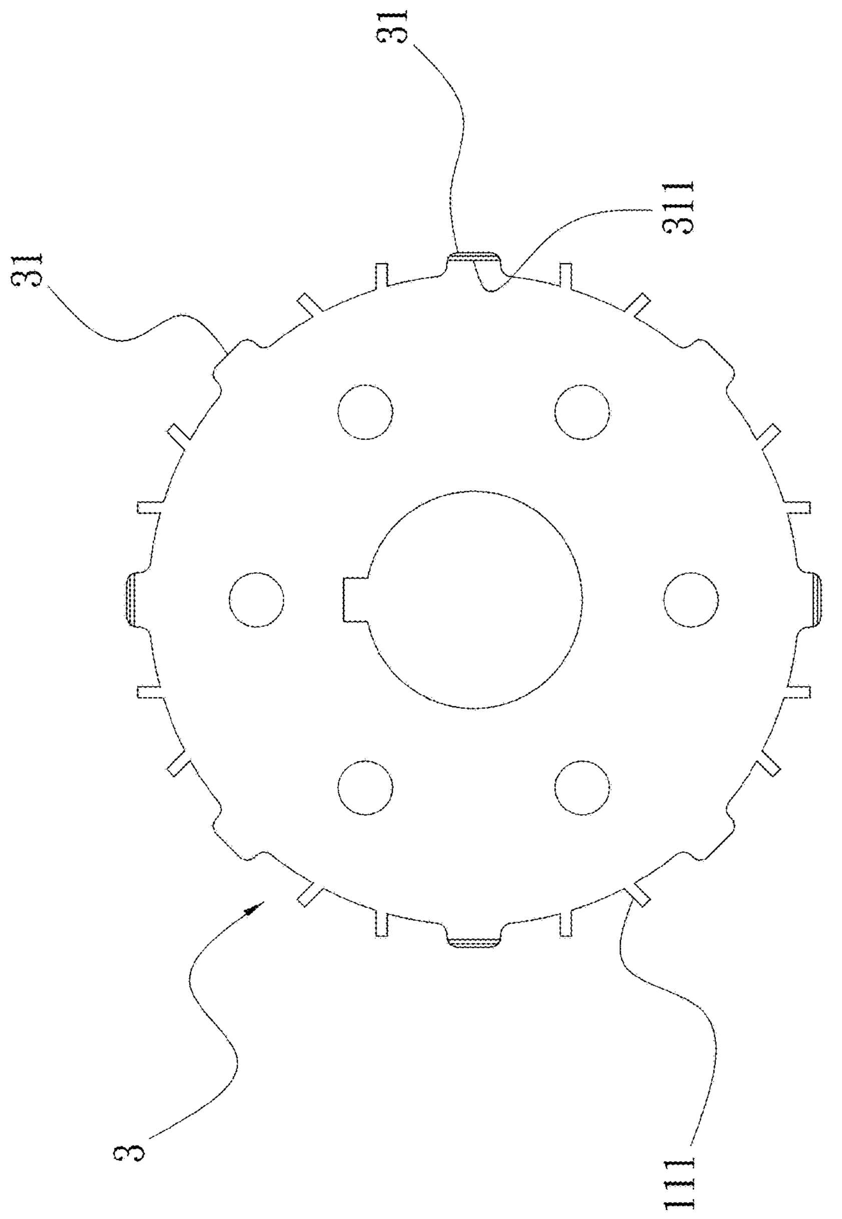
FIG. 7 is a front view of an end surface silicon steel sheet of the rotor magnets fixing structure according to a second embodiment of the present invention.
Figure 8:
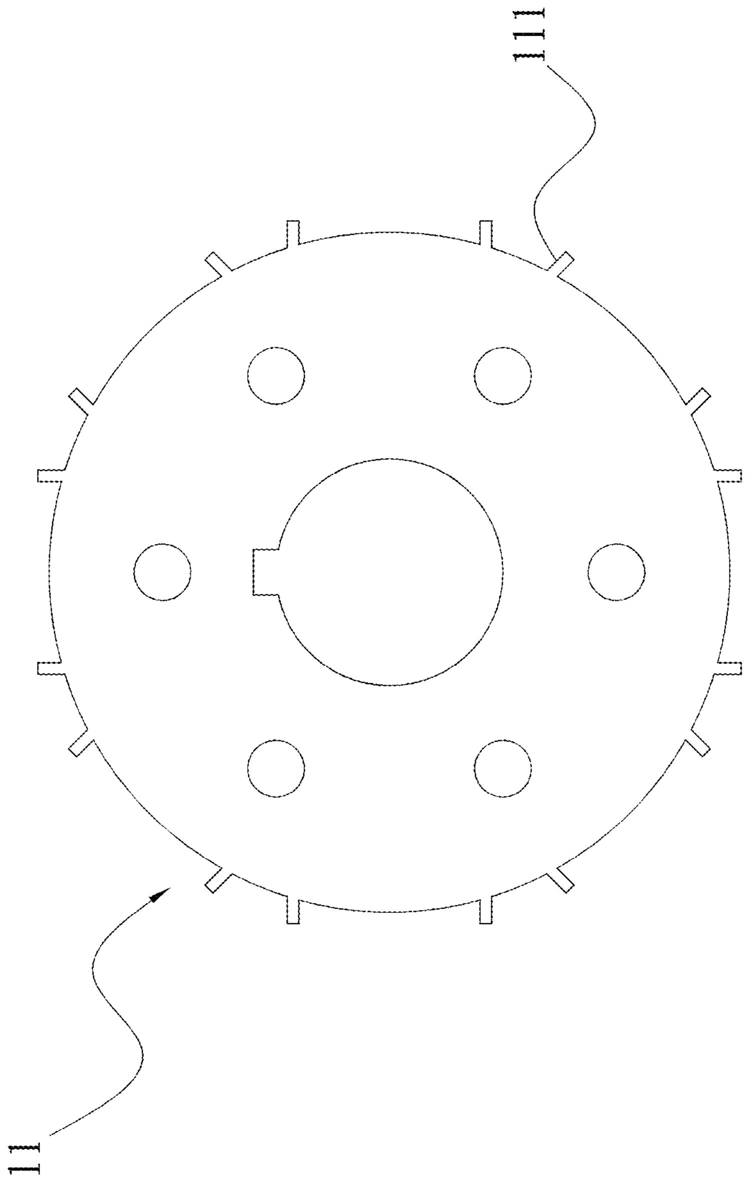
FIG. 8 is a front view of a silicon steel sheet included in the rotor magnets fixing structure according to the present invention.

Please refer to FIG. 2, which is an assembled perspective view of a rotor magnets fixing structure according to a first embodiment of the present invention; to FIGS. 3 and 4, which are exploded top and bottom views, respectively, of FIG. 2; to FIGS. 6 and 7, which are front views of end surface silicon steel sheets according to a first and a second embodiment, respectively, of the present invention; and to FIG. 8, which is a front view of a silicon steel sheet included in the present invention.

As shown in FIGS. 2 to 4, the rotor magnets fixing structure according to the first embodiment of the present invention includes a magnetizable main body 1, a plurality of magnets 2, and two end surface silicon steel sheets 3. The magnet main body 1 can be made of a metal material, such as silicon steel, for providing an effect of magnetism. The magnets 2 are disposed on around an outer circumferential surface of the magnetizable main body 1 and are correspondingly held in place by the two end surface silicon steel sheets 3 from an upper end surface and a lower end surface of the magnetizable main body 1.

As shown in FIG. 8, the magnetizable main body 1 can be formed of a plurality of silicon steel sheets 11 that are laminated in an axial direction of the magnetizable main body 1 to serve as a magnetic channel of the rotor. For example, the silicon steel sheets 11 can be configured as discs having a consistent specification, such that the round surfaces of any two disc-shaped silicon steel sheets 11 located adjacent to each other can be correspondingly laminated and have the same outer peripheral size, allowing the silicon steel sheets 11 to be stacked up axially to form the magnetizable main body 1. Therefore, the magnetizable main body 1 defines a round cross-sectional surface consistent with the round surfaces defined by the silicon steel sheets 11, while the magnetizable main body 1 has an axial height defined by an overall height of a cylindrical body formed by the laminated silicon steel sheets 11. Further, the magnetizable main body 1 has at least one connecting area 10 formed on the outer circumferential surface thereof.

Please refer to FIGS. 3 and 4. The magnets 2 respectively have a height corresponding to that of the magnetizable main body 1 and are correspondingly disposed in the at least one connecting area 10. For example, the magnets 2 may have a substantially crescent cross-sectional shape. That is, the magnets 2 respectively have at least two curved sides, including an outer curved side 21 facing radially outward and an inner curved side 22 facing toward the outer circumferential surface of the magnetizable main body 1; and the two curved sides 21, 22 together define an outer periphery of the magnet 2. The outer curved side 21 is a convex surface relative to the magnetizable main body 1 and has a curvature larger than that of the inner curved side 22 located opposite to the outer curved side 21. All the inner curved sides 22 of the magnets 2 have a curvature, an area, a shape, and dimensions corresponding to those of the at least one connecting area 10 of the magnetizable main body 1, such that the magnets 2 can be fitly and correspondingly disposed in the at least one connecting area 10. Further, each of the magnets 2 has a crescent upper end surface and a crescent lower end surface, on each of which a recess 20 is provided.

In practical application, the number of the magnets 2 and the corresponding connecting areas 10 are not necessarily limited to that shown in the present invention, so long as the magnets 2 can magnetically drive the rotor to operate stably. In the first embodiment of the present invention, for example, there may be eight (8) magnets 2 disposed in eight (8) corresponding connecting areas 10. And, the magnets 2 are preferably circular symmetrically fitted on around the outer circumferential surface of the magnetizable main body 1. In some embodiments, the magnets 2 can even be closely disposed side by side on along the outer circumferential surface of the magnetizable main body 1. In other words, the magnets 2 can be correspondingly fitted in the connecting areas 10 on the outer circumferential surface of the magnetizable main body 1 without any gap left between any two adjacent magnets 2. The arrangement of the magnets 2 on the magnetizable main body 1 can be flexibly designed without being restricted to the illustrated embodiments of the present invention.

Figure 5:
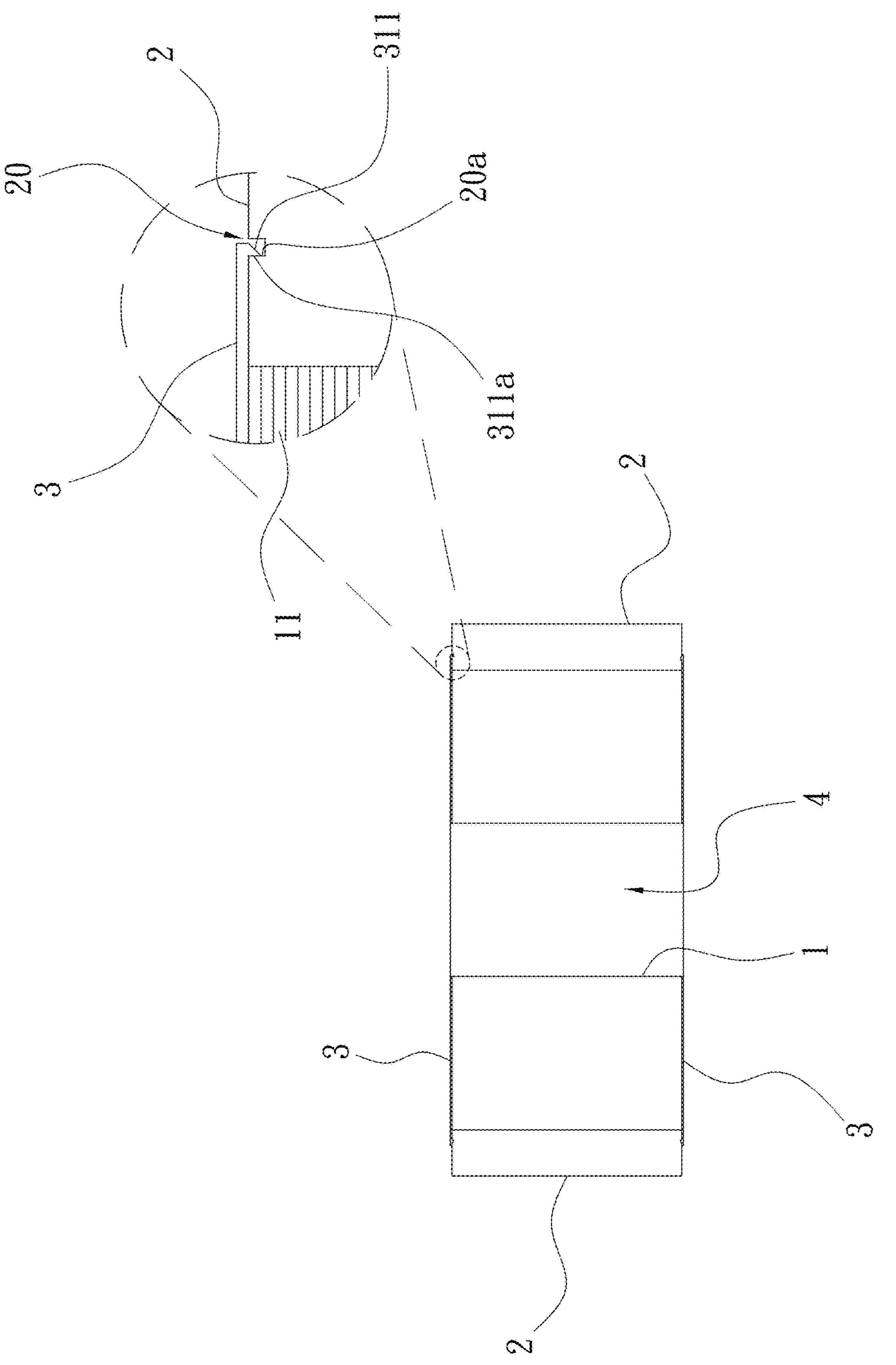
FIG. 5 is a sectional side view of the rotor magnets fixing structure of FIG. 2.

Please refer to FIG. 5. The end surface silicon steel sheets 3 are located at the upper and the lower end surface of the magnetizable main body 1. That is, the two end surface silicon steel sheets 3 are correspondingly laminated to the two outermost silicon steel sheets 11 of the magnetizable main body 1. For example, the end surface silicon steel sheets 3 may be respectively configured as a disc having a round surface similar to that of the silicon steel sheets 11, so that the end surface silicon steel sheets 3 do not occupy any additional space of the rotor. However, the end surface silicon steel sheets 3 are respectively provided on an outer periphery at positions corresponding to the magnets 2 with at least one radially outward protruded fixing lug 31. As shown in FIG. 6, since the magnets 2 have an overall height corresponding to that of the magnetizable main body 1, the radially protruded fixing lugs 31 are correspondingly located on and cover at least a partial area of the upper and the lower end surfaces of the magnets 2.

It is not necessary for the fixing lugs 31 to cover the entire area of the upper and lower end surfaces of the magnets 2. For example, as shown in FIGS. 3 to 5, even the fixing lugs 31 can cover only a relatively small area, such as a rectangular area, they can still clamp the magnets 2 from an upper and a lower side thereof, as long as the crescent-shaped upper and lower end surfaces of the magnets 2 are correspondingly covered by the fixing lugs 31 in the axial direction. Further, a part of the fixing lugs 31 respectively have a radially outward end extending axially to form a retaining hook 311; and the retaining hooks 311 correspondingly interfere with and hook to the recesses 20 formed on the upper and lower end surfaces of the magnets 2. In other words, the retaining hooks 311 and the recesses 20 serve as tenons and a mortises that are joined together to limit the end surface silicon steel sheets 3 and the magnets 2 from moving relative to each other.

Therefore, with the round surfaces and the protruded fixing lugs 31 of the end surface silicon steel sheets 3, the upper and lower end surfaces of the magnetizable main body 1 and the magnets 2 are at least partially covered by the end surface silicon steel sheets 3. Further, through engagement of the protruded retaining hooks 311 with the recesses 20, the magnets 2 are limited to a position outside the outer circumferential surface of the magnetizable main body 1 and prevented from unexpected separation from the magnetizable main body 1 from any direction. Meanwhile, when the magnets 2 are fixed in place by the fixing lugs 31 of the end surface silicon steel sheets 3, relative positions among the magnets 2 are also fixed.

At this point, the magnets 2 are positioned around the outer circumferential surface of the magnetizable main body 1. Therefore, so long as a space between any two magnets 2 is smaller than a diameter of the magnetizable main body 1 while the magnets 2 and the magnetizable main body 1 are rotatable about a common rotating shaft fitted in a shaft bore 4, it is able to ensure that the magnets 2 can be correspondingly distributed on and fixed to the outer circumferential surface of the magnetizable main body 1 without separating from the magnetizable main body 1. Thus, in the first embodiment of the present invention, although the fixing lugs 31 of the two end surface silicon steel sheets 3 respectively provide a relatively small area to cover the corresponding magnets 2, the magnets 2 can still be effectively limited to the fixing positions relative to the end surface silicon steel sheets 3. In brief, in the present invention, the magnets 2 can be fixed to the magnetizable main body 1 with less volume of material compared to the prior art.

Further, since the fixing lugs 31 are separately radially protruded from the outer peripheries of the end surface silicon steel sheets 2, they can work independently without influencing each other. Moreover, the retaining hooks 311 of the fixing lugs 31 can be more securely engaged with the recesses 20 on the magnets 2 when the fixing lugs 31 are subjected to a radially outward tensile strain. This condition not only saves the provision of additional fixing elements, but also overcomes the problem in fixing the magnets 2 to the magnetizable main body 1 when the latter is formed of a relatively hard material like silicon steel. In the present invention, the tensile strain is also utilized to enhance the stability of engagement of the retaining hooks 311 with the recesses 20.

To ensure the retaining hooks 311 of the fixing lugs 31 on the end surface silicon steel sheets 2 can be engaged with the recesses 20 on the upper and lower end surfaces of the magnets 2 without separating therefrom, the fixing lugs 31 can respectively have a protrusion length and width to be designed with reference to the toughness and rigidity of the materials of the end surface silicon steel sheets 3 and the magnetizable main body 1, and the retaining hooks 311 can be adjustably spaced accordingly. In this manner, the fixing lugs 31 themselves can directly provide a very tough fixing function without being helped by other additionally provided fixing elements. Therefore, even under the condition of reduced elements, the present invention can still effectively produce a tensile force, which enables the fixing lugs 31 to hold the magnets 2 to the magnetizable main body 1 when the retaining hooks 311 are engaged with the recesses 20, and the present invention can also axially holds the silicon steel sheets 11 of the magnetizable main body 1 in place to overcome the risk that the silicon steel sheets 11 are possibly separated from the upper and lower end surfaces of the magnetizable main body 1.

Accordingly, the end surface silicon steel sheets 3 can be more flexibly designed to allow adjustment of the tensile force to be set. This not only facilitates the mounting operation of the end surface silicon steel sheets 3, but also enables the retaining hooks 311 of the fixing lugs 31 to interfere and engage with the recesses 20 more stably. For example, when any one of the fixing lugs 31 requires a tensile force applied thereto for the retaining hook 311 provided thereon to engage with a corresponding recess 20, it would not be affected by other fixing lugs 31, of which the retaining hooks 311 have been engaged with the recesses 20 on the corresponding magnets 2. Further, even if the fixing lugs 31 are subjected to any external force during operation of the rotor, their strain may occur individually to dissipate the force that is unevenly applied to local areas. Therefore, it is able to reduce the possibility of having magnets 2 separating from their original positions when the fixing effect is poor due to the use of a relatively rigid material to form the end surface silicon steel sheets 3, and the magnets 2 can be more stably fixed to the end surface silicon steel sheets 3 and the magnetizable main body 1.

As can be seen in FIG. 5, the retaining hooks 311 can respectively be wedge-shaped to include a fixing wall **311*a*, which is facing radially inward and extended axially in perpendicular to the end surface silicon steel sheet 3; and the recesses 20 respectively include an inner side surface 20*a*, which is tightly abutted against a contact area of the fixing wall 311*a*, such that the contact area between the fixing wall 311*a* and the inner side surface 20*a* is able to bear a relatively large frictional force. Particularly, with the wedge-shaped configuration of the retaining hook 311, a retaining thickness the retaining hook 311 can have is increased when the retaining hook 311 extends deeper into the recess 20 to interfere therewith. Meanwhile, an abutting tension or the frictional force the retaining hook 311** can correspondingly provide or withstand is higher.

Alternatively, the retaining hooks 311 can be respectively shaped as a protruded half-cylinder. In this case, the retaining hooks 311 respectively have a curved surface (not shown) and the recesses 20 respectively have a semicircular inner side surface 20*a*, and the curved surface of the retaining hook 311 and the semicircular inner wall surface 20*a* are correspondingly abutted against each other tightly. The fixing lugs 31 subjected to a tensile force can enable a tight-pressing abutting of the retaining hooks 311 and the recesses 20 against each other. Besides, it is also able to set the retaining hook 311 to have a diameter length and a volume capable of being fully filled in the corresponding recess 20, such that the retaining hook 311 filled in the recess 20 is slightly compressed or deformed (e.g. pressed) to tightly interfere with and be retained to the recess 20. At this point, the curved surface of the half-cylindrical retaining hook 311 being pressed can be in more uniform and tight contact with the inner side surface 20*a* of the recess 20.

In some embodiments, a shaft bore 4 can be provided at a central area of the round magnetizable main body 1 and the end surface silicon steel sheets 3, and a plurality of rivet holes 5 is circumferentially spaced along a radially inner portion of the magnetizable main body 1 and the end surface silicon steel sheets 3. The shaft bore 4 and the rivet holes 5 on the end surface silicon steel sheets 3 are located correspondingly to those formed on the silicon steel sheets 11. Rivets (not shown) can be fitted in the rivet holes 5 to tightly fix the end surface silicon steel sheets 3 and the silicon steel sheets 11 into an axially and vertically stacked unit to complete the assembly of the rotor magnets fixing structure according to the present invention.

Please refer to FIG. 8. In some embodiments, the silicon steel sheets 11 can be provided on along their respective outer periphery with an even number of circular symmetrically arranged groups of radially outward protruded extension sections 111. Please also refer to FIG. 3. Each group of the extension sections 111 includes two paired extension sections 111. When the silicon steel sheets 11 are laminated to form the magnetizable main body 1, the extension sections in pairs 111 form an even number of guide ribs 12 in the connecting areas 10, such that there are two guide ribs 12 located at to two lateral sides of each connecting area 10. When the magnets 2 are disposed in the corresponding connecting areas 10, two lateral sides of each magnet 2 are abutted against the two guide ribs 12 formed at the two lateral sides of the connecting area 10, and the magnets 2 are restricted by the guide ribs 12 to set in the connecting areas 10 and effectively prevented from separating from the connecting areas 10 circumferentially when the rotor rotates.

The end surface silicon steel sheets 3 can also be formed on their respective outer periphery with the extension sections 111 corresponding to those formed on the silicon steel sheets 11. However, it is noted this embodiment is not necessarily required since the guide ribs 12 have already formed on the magnetizable main body 1, the extension sections 111 can be omitted from the end surface silicon steel sheets 3 or even some of the silicon steel sheets 11 without reversely influencing the positional restriction function of the guide ribs 12.

In a further embodiment, the guide ribs 12 can respectively have a claw (not shown) formed on a front (or radially outer) edge thereof for clamping on the magnets 2 set in the connecting areas 10 to provide a more secured positional limiting effect. Alternatively, the two guide ribs 12 correspondingly formed at the two lateral sides of each connecting area 10 can have their radially outer edges slightly bent toward each other to define a narrowed opening between them. When the crescent-sectioned magnets 2 are disposed into the connecting areas 10 correspondingly, two narrow pointed ends of the magnets 2 can be confined in the connecting areas 10 by the narrowed openings of the guide ribs 12 in pairs, preventing the magnets 2 from easily moving out of the connecting areas 10.

In the above embodiments, the guide ribs 11 can limit the magnets 2 from moving away from the magnetizable main body 1 circumferentially and radially. In addition, the end surface silicon steel sheets 3 also have fixing lugs 31 for correspondingly covering the upper and lower end surfaces of the magnets 2. With these arrangements, the end surface silicon steel sheets 3 can always firmly hold the magnets 2 in place from the upper and the lower side of the magnetizable main body 1, even if any of the magnets 2 is not provided with the recess 20 for interfering and engaging with the retaining hook 311 on the fixing lug 31. On the other hand, since it is necessary for the end surface silicon steel sheets 3 to be correspondingly attached to the upper and lower ends of the magnets 2, at least a part of the fixing lugs 31 of the end surface silicon steel sheets 3 must have their retaining hooks 311 to be correspondingly engaged with the recesses 20 of a part of the magnets 2.

In this case, the magnets 2 having the recesses 20 provided thereon should be at least larger than two (2) in number, and the fixing lugs 31 having the retaining hooks 311 provided on the end surface silicon steel sheets 3 should also be larger than two (2) in number, for example, more than three, and no other tenon-mortise like structures are necessary. This is because the guide ribs 12 in each pair provide a narrowed opening between them. With this arrangement, the other fixing lugs 31 can be formed without the retaining hooks 311 but still provide the function of limiting the magnets 2 from moving out of the corresponding connecting areas 10, so long as these fixing lugs 31 can correspondingly cover the upper end surface and the lower end surface of at least a part of the magnets 2.

For example, as shown in FIG. 7, suppose that there are eight (8) magnets 2 provided around the magnetizable main body 1 and the guide ribs 12 in each pair have radially outer edges slantly bent toward each other. In this case, so long as there are four of the eight magnets 2 provided at upper and lower ends with the recesses 20 and four of the eight (8) fixing logs 31 on each of the two end surface silicon steel sheets 3 provided with the retaining hooks 311 correspondingly, all the eight magnets 2 can be securely fixed in the connecting areas 10. To ensure stable fixation of the magnets 2 and even spread of the fixing tensile force, it is preferred the magnets having the recesses 20 formed thereon are circular symmetrically arranged in the connecting areas 10 around the magnetizable main body 1. That is, as shown in FIG. 7, the four magnets 2 with the recessed 20 and the four magnets 2 without the recesses 20 are alternately and circular symmetrically arranged along the outer periphery of the end surface silicon steel sheet 3.

According to the present invention, the rotor magnets fixing structure includes only the fixing lugs 31 and the extension sections 111 protruded from the outer peripheries of the end surface silicon steel sheets and the silicon steel sheets 11, respectively, to hold the magnets 2 to the outer circumferential surface of the magnetizable main body 1. With this rotor magnets fixing structure, the parts needed to fix the magnets 2 are reduced and less volume and material are needed by the fixing parts to largely decrease the manufacturing cost of the rotor and to effectively enable stable fixation of the magnets 2 to the magnetizable main body 1. Further, the fixing lugs 31 protruded from the outer periphery of each of the end surface silicon steel sheets 3 are independent of each other to stably provide the tensile force for fixing the magnets 2 to the magnetizable main body 1; and any external force being unevenly applied to any local area of the end surface silicon steel sheets 3 can also be evenly dispersed to ensure stable fixation of the magnets 2. Also, the fixing lugs 31 do not occupy any additional space around the outer circumferential surface of the magnetizable main body 1, enabling the magnets 2 to be set more flexibly according to actual need in use. Moreover, the fixing lugs 31 can work with the guide ribs 12 formed on the magnetizable main body 1 by the extension sections 111 of the laminated silicon steel sheets 11 to further enable omission of some of the retaining hooks 311 and the recesses 20 while still achieve stable fixation of the magnets 2 to the magnetizable main body 1.

In conclusion, according to the present invention, the magnets 2 can be stably fixed to the corresponding connecting areas 10 so long as the magnets 2 are provided on their respective upper end and lower end with the recess 20 in correspondence to the retaining hooks 311 provided on the end surface silicon steel sheets 3. In this manner, it is able to overcome the problems in the conventional way of fixing the rotor magnets, including the need of drilling holes in high precision and limited flexibility in the rotor design. Meanwhile, with the present invention, the required parts, manufacturing cost and machining precision all are reduced, while the frictional force that can be withstood at the interfaces between the magnets and the end surface silicon steel sheets 3 and the silicon steel sheets 11 is increased to ensure stable fixation of the magnets 2 to the magnetizable main body 1; and the risk of damage, malfunction or failure of the rotor caused by unexpected separation of any parts from the rotor in operation can be reduced.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A rotor magnets fixing structure, comprising:

a magnetizable main body consisting of a plurality of silicon steel sheets that are axially laminated to one another; and the magnetizable main body being formed on around an outer circumferential surface with at least one connecting area;

a plurality of magnets having an overall height corresponding to that of the magnetizable main body and respectively including a radially outer curved side and an opposite inner curved side; the inner curved sides of the magnets being in fit contact with the at least one connecting area on the outer circumferential surface of the magnetizable main body; and at least a part of the magnets being provided on their respect upper end surface and lower end surface with a recess; and two end surface silicon steel sheets being disposed on an upper end surface and a lower end surface of the magnetizable main body, respectively; the end surface silicon steel sheets being correspondingly provided on along their respective outer periphery at positions corresponding to the magnets with at least one radially outward protruded fixing lug; the fixing lugs covering the upper end surfaces and the lower end surfaces of the magnets, and at least a part of the fixing lugs being formed with an axially extended retaining hook; and the retaining hooks being correspondingly interfering with and hooking to the recesses formed on the upper end surfaces and the lower end surfaces of the magnets.

2. The rotor magnets fixing structure as claimed in claim 1, wherein the retaining hooks respectively have a wedge-shaped configuration to include a radially inward fixing wall for correspondingly tightly abutting against an inner side surface of one corresponding recess.

3. The rotor magnets fixing structure as claimed in claim 1, wherein the silicon steel sheets are provided on along respective outer periphery with an even number of radially outward protruded extension sections; the extension sections of the axially laminated silicon steel sheets being axially aligned with one another to form an even number of paired guide ribs; and the guide ribs in each pair being located at two lateral sides of each connecting area.

4. The rotor magnets fixing structure as claimed in claim 3, wherein the magnets having the recesses provided thereon are more than two in number; and the fixing lugs having the retaining hook provided on the end surface silicon steel sheets are more than two in number.

5. The rotor magnets fixing structure as claimed in claim 4, wherein the magnets having the recesses provided thereon are circular symmetrically disposed in corresponding ones of the connecting areas on the outer circumferential surface of the magnetizable main body.

* * * * *